United States Patent
Kim

(10) Patent No.: US 11,701,962 B2
(45) Date of Patent: Jul. 18, 2023

(54) VEHICLE ACTIVE AIR FLAP SYSTEM AND ACTIVE AIR FLAP CONTROL METHOD

(71) Applicant: HYUNDAI MOBIS Co., Ltd., Seoul (KR)

(72) Inventor: Jang Ho Kim, Seoul (KR)

(73) Assignee: Hyundai Mobis Co., Ltd., Seoul (KR)

( * ) Notice: Subject to any disclaimer, the term of this patent is extended or adjusted under 35 U.S.C. 154(b) by 0 days.

(21) Appl. No.: 17/476,984

(22) Filed: Sep. 16, 2021

(65) Prior Publication Data

US 2022/0089017 A1 Mar. 24, 2022

(30) Foreign Application Priority Data

Sep. 18, 2020 (KR) ........................ 10-2020-0120773

(51) Int. Cl.
*B60K 11/08* (2006.01)

(52) U.S. Cl.
CPC .................................. *B60K 11/085* (2013.01)

(58) Field of Classification Search
CPC ................. B60K 11/085; B60K 35/00; B60K 2370/152; G07C 5/0816; Y02T 10/88; B60R 16/0232; B60S 3/04; B60Y 2306/05; B60Y 2400/30
See application file for complete search history.

(56) References Cited

U.S. PATENT DOCUMENTS

| | | | | |
|---|---|---|---|---|
| 4,924,826 A * | 5/1990 | Vinson | ...................... | F01P 7/12 123/195 C |
| 8,833,498 B2 * | 9/2014 | Charnesky | ................ | F01P 7/10 296/180.5 |
| 9,827,845 B2 * | 11/2017 | Miyaji | .................. | B60K 11/085 |
| 11,167,635 B2 * | 11/2021 | Brinkmann | ............... | B60S 1/66 |
| 11,208,945 B1 * | 12/2021 | Smith | ................. | F02B 29/0406 |
| 2011/0288717 A1 * | 11/2011 | Yu | ......................... | B60K 11/085 454/75 |
| 2014/0231161 A1 * | 8/2014 | Lehti | ..................... | B62D 25/105 180/68.1 |
| 2017/0321593 A1 * | 11/2017 | Wolff | .................... | B60K 11/085 |
| 2019/0031199 A1 * | 1/2019 | Dudar | .................... | B60K 11/085 |
| 2019/0226386 A1 * | 7/2019 | Jolk | ...................... | B60K 11/085 |
| 2019/0272687 A1 * | 9/2019 | Dudar | ..................... | F01P 5/043 |
| 2020/0039346 A1 * | 2/2020 | Morita | ...................... | F01P 11/20 |
| 2020/0393859 A1 * | 12/2020 | Thompson | .......... | G05D 23/1917 |

FOREIGN PATENT DOCUMENTS

KR 10-2018-0114411 A 10/2018

* cited by examiner

*Primary Examiner* — Kurt Philip Liethen
(74) *Attorney, Agent, or Firm* — Morgan, Lewis & Bockius LLP

(57) ABSTRACT

A vehicle active air flap system includes a flap configured to open or close an outdoor air inlet disposed in a grill of a vehicle, at least one sensor configured to detect various types of state information of the vehicle, and a controller configured to selectively adopt various sensing data values detected by the at least one sensor according to whether the vehicle starts and then compare at least one sensing data value of the adopted sensing data values with a preset vehicle driving condition data value to open or close the flap according to a compared result value.

20 Claims, 10 Drawing Sheets

VEHICLE ACTIVE AIR FLAP SYSTEM AND ACTIVE AIR FLAP CONTROL METHOD

CROSS-REFERENCE TO RELATED APPLICATION

This application claims priority to and the benefit of Korean Patent Application No. 10-2020-0120773, filed on Sep. 18, 2020, the disclosure of which is incorporated herein by reference in its entirety.

BACKGROUND

1. Technical Field

The present disclosure relates to an active air flap (AAF) technology for a vehicle.

2. Discussion of Related Art

An active air flap (AAF) is installed at a front bumper and the inside of a grill of a vehicle (or attached to the grill) and opens or closes an air inlet (outdoor air inlet) of the grill depending on conditions (for example, driving conditions, or the like) of the vehicle.

As a specific example, the active air flap closes a flap to close the air inlet in order to reduce air resistance and improve fuel efficiency when the vehicle travels at a high speed or opens the flap to open the air inlet in order to lower a temperature inside an overheated engine room.

In this case, when the active air flap is an external type flap, the active flap is easily contaminated by foreign substances because the flap is exposed to the exterior of the bumper.

In this case, it is necessary to wash the flap, but there is a problem in that it is not easy to wash the contaminated flap due to the existing operation logic.

For example, since the external active air flap is opened when the engine heat of the vehicle is excessive or an air conditioner is turned on, it is difficult to wash a contaminated portion of the flap when using an automatic car wash facility in a state where the vehicle starts.

In particular, when using the automatic car wash facility in summer, automatic car washing is usually performed in a state where the air conditioner is turned on. In this case, since the existing operating logic is maintained in the state where the flap is open, it is difficult to wash the contaminated portion. Accordingly, in order to wash the contaminated portion of the flap, there is an inconvenience in that a separate washing operation should be additionally performed in a state in which the flap is closed after an engine is turned off.

SUMMARY

The present disclosure provides a vehicle active air flap system and a vehicle active air flap control method capable of washing a contaminated portion of a flap, even when automatic washing (and/or manual washing) is performed, by closing the flap when a state of the vehicle matches set driving conditions (vehicle speed, heat of engine, or the like) regardless of whether the vehicle starts or not.

The problems to be solved by the present disclosure are not limited to the problems mentioned above, and other problems not mentioned here will be clearly understood by those skilled in the art from the following description.

According to an aspect of the present disclosure, there is provided a vehicle active air flap system including a flap configured to open or close an outdoor air inlet disposed in a grill of a vehicle, at least one sensor configured to detect various types of state information of the vehicle, and a controller configured to selectively adopt various sensing data values detected by the at least one sensor according to whether the vehicle starts and then compare at least one sensing data value of the adopted sensing data values with a preset vehicle driving condition data value to open or close the flap according to a compared result value.

The controller may include a display module that is electrically connected to the at least one sensor and displays an alarm message related to a vehicle state.

The display module may not be included in the controller and may be configured to be electrically connected to the at least one sensor to display an alarm message related to a vehicle state.

The display module may display an automatic car wash mode and a manual car wash mode, in which the flap is selectively openable or closable according to a preset driving condition, on a screen.

The controller may include a wash button including an automatic car wash mode and a manual car wash mode in which the flap is selectively openable or closable according to a preset driving condition.

In the automatic car wash mode, the flap may be switched to a closed state when a vehicle start state is ON or OFF, and in the manual car wash mode, the flap may be switched to the closed state when the vehicle start state is OFF.

The at least one sensor may transmit different sensing data values to the controller according to whether the vehicle starts.

The at least one sensor may sense data values of a vehicle speed, a coolant temperature, a side mirror folding state, a window opening/closing state, and a gear position when the vehicle start state is ON, and sense data values of the coolant temperature and an outside temperature when the vehicle start state is OFF.

The controller may control driving of the flap so that the outdoor air inlet of the grill is closed in a case where the data values sensed by the at least one sensor indicate that the vehicle speed is 30 km/h or less, the coolant temperature is 105° C. or less, a side mirror is folded, a window is closed, and a gear position is neutral or parked when the vehicle start state is ON.

The controller may immediately open the flap in a case where the coolant temperature is greater than 105° C. among the data values sensed by the at least one sensor when the vehicle start state is OFF.

The controller may close the flap for a certain period of time when the outside temperature is greater than 40° C. in a state where the coolant temperature is 105° C. or less, and open the flap when the outside temperature is still greater than 40° C. after the certain period of time.

According to another aspect of the present disclosure, there is provided a vehicle active air flap system including a flap configured to open or close an outdoor air inlet disposed in a grill of a vehicle, a display module having an automatic car wash mode and a manual car wash mode to selectively open or close the flap according to a preset driving condition, and a controller configured to selectively adopt each driving mode according to a wash mode of the driving unit and open or close the flap based on adopted data information.

The display module may allow the flap to be switched to a closed state by the controller in a state where the vehicle start state is ON or OFF when the automatic car wash mode is performed, and allow the flap to be switched to a closed state by the controller in a state where the vehicle start state is OFF when the manual car wash mode is performed.

The driving condition in the automatic car wash mode may be set to a vehicle speed of 30 km/h or less, a coolant temperature of 105° C. or less, a side mirror folded state, a window closed state, and a neutral or parked position of a gear.

The driving condition of the manual car wash mode may be set to a coolant temperature of 105° C. or less and an outside temperature of 40° C. or less.

The controller may immediately open the flap in a case where a coolant temperature is greater than 105° C. when the mode is switched to the manual car wash mode, and close the flap for a certain period of time when the outside temperature is greater than 40° C. in a state where the coolant temperature is 105° C. or less.

According to still another aspect of the present disclosure, there is provided a vehicle active air flap control method including a sensing data value acquisition operation of sensing and acquiring various types of state information of a vehicle, a car wash mode operation of comparing an acquired sensing data value with a preset driving condition data value, and switching a flap, which opens or closes an outdoor air inlet of a vehicle grill, to a car wash logic method when a result value matches the preset driving condition, and a normal mode operation of switching the flap to a normal control logic method when the sensing data value does not match the driving condition.

The sensing data value acquisition operation may include a first sensing operation and a second sensing operation.

In the first sensing operation, data values of a vehicle speed, a coolant temperature, a side mirror folding state, a window opening/closing state, and a gear position are sensed when a vehicle start state is ON.

In the second sensing operation, data values of the coolant temperature and an outside temperature are sensed when the vehicle start state is OFF.

The car wash mode operation may include a first flap driving operation, a second flap driving operation, and a third flap driving operation.

In the first flap driving operation, driving of the flap may be controlled so that the outdoor air inlet of the grill is closed when the data values sensed in the first sensing operation indicate that the vehicle speed is 30 km/h or less, the coolant temperature is 105° C. or less, a side mirror is folded, a window is closed, and the gear is in neutral or a parked position.

In the second flap driving operation, the flap may immediately open the flap when the coolant temperature is greater than 105° C. among the data values sensed in the second sensing operation.

In third flap driving operation, the flap may be closed at a certain period of time when the outside temperature is greater than 40° C. in a state where the coolant temperature is 105° C. or less after the second flap driving operation, and the flap may be opened when the outside temperature is still greater than 40° C. after the certain period of time.

BRIEF DESCRIPTION OF THE DRAWINGS

The above and other objects, features and advantages of the present disclosure will become more apparent to those of ordinary skill in the art by describing exemplary embodiments thereof in detail with reference to the accompanying drawings, in which.

DETAILED DESCRIPTION OF EXEMPLARY EMBODIMENTS

Advantages and features of the present disclosure and methods of achieving them will become apparent with reference to the embodiments described below in detail in conjunction with the accompanying drawings. However, the present disclosure is not limited to the embodiments disclosed below but will be implemented in various different forms, and the present embodiments are only provided so that the disclosure of the present disclosure is complete and to fully inform those of ordinary skill in the art to which the present disclosure pertains to the scope of the disclosure, and the present disclosure is defined by the description of the claims. Meanwhile, terminologies used herein are for the purpose of describing the embodiments and are not intended to limit the present disclosure. In the present specification, the singular also includes the plural, unless specifically stated otherwise in the phrase. As used herein, "comprises" or "comprising" includes the presence or addition of one or more components, steps, operations and/or elements other than stated elements, steps, operations and/or elements.

Hereinafter, exemplary embodiments of the present disclosure will be described in detail with reference to the accompanying drawings.

Vehicle Active Air Flap System

Figure 1:
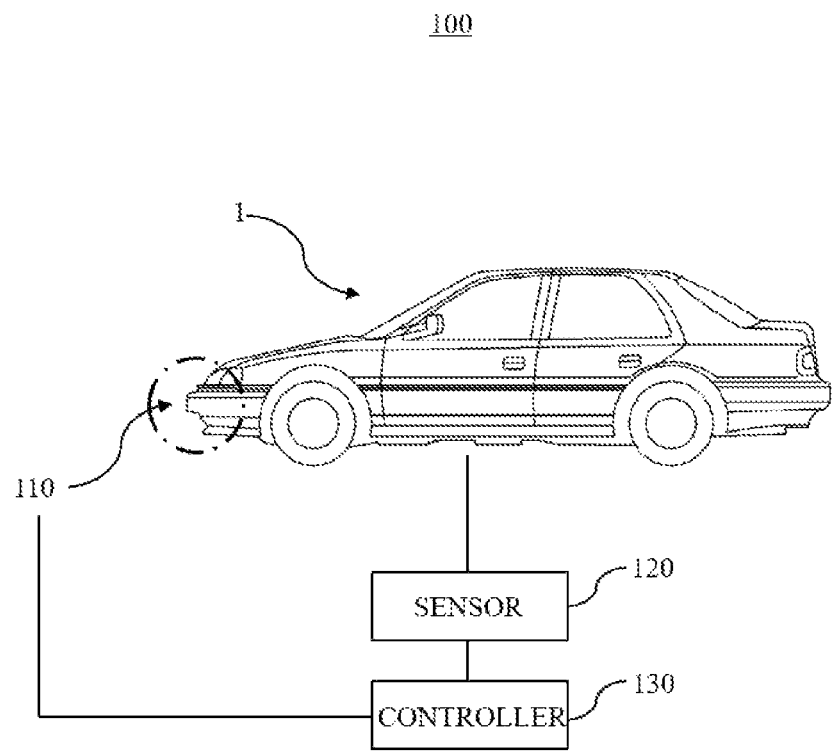
FIG. 1 is a view schematically showing a vehicle active air flap system according to one embodiment of the present disclosure.

FIG. 1 is a view schematically showing a vehicle active air flap system according to one embodiment of the present disclosure.

Referring to FIG. 1, a vehicle active air flap system 100 according to one embodiment of the present disclosure is an external type flap system and includes a flap 110, a sensor 120, and a controller 130.

The flap 110 opens or closes an outdoor air inlet disposed in a grill of a vehicle 1. The flap 110 is provided as at least one flap to improve traveling safety of the vehicle 1 and reduce air resistance generated when the vehicle travels, thereby helping to improve fuel efficiency.

The sensor 120 detects various types of state information of the vehicle 1. To this end, the sensor 120 is configured in a form in which each type of sensor is built in to the vehicle 1 and may be disposed at each designated location in the vehicle 1.

The controller 130 selectively adopts various sensing data values detected by the sensor 120 depending on whether the vehicle 1 starts and compares the adopted sensing data value with a preset driving condition data value of the vehicle 1 to adjust opening or closing of the flap 110 according to the compared result value.

Here, the preset driving conditions of the vehicle 1 mean conditions in which reference data for items related to the opening/closing control of the flap 110 is set. For example, the preset driving conditions of the vehicle 1 include a numerical value and/or a numerical range set as each reference data for items such as a speed of the vehicle 1, a coolant temperature, a side mirror folding state, a window opening/closing state, a gear position, and an outside temperature.

Figure 2:
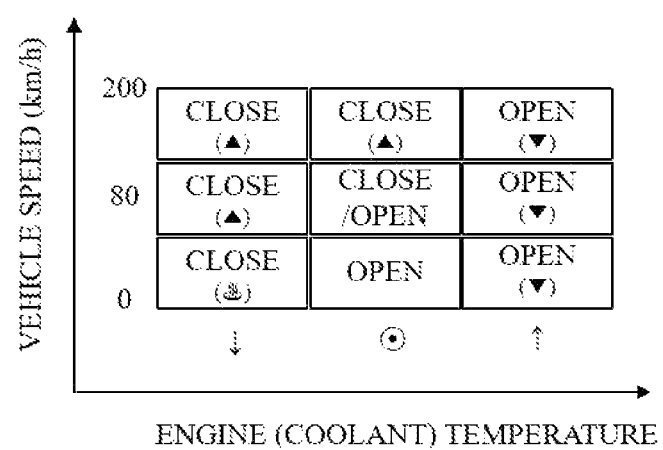
FIG. 2 is a diagram schematically illustrating an operation logic of the vehicle active air flap system according to an embodiment of the present disclosure.

FIG. 2 is a diagram schematically illustrating an operation logic of the vehicle active air flap system according to an embodiment of the present disclosure.

The diagram shown in FIG. 2 shows the operation logic of the active air flap system (100 in FIG. 1) according to one embodiment of the present disclosure. An operation of an active air flap system is primarily determined by heat of an engine and the vehicle speed.

The active air flap system to be mainly dealt with in the present disclosure is for closing the flap by applying different state information according to vehicle start ON/OFF when performing automatic car washing and/or manual car washing.

For example, in the conventional active air flap, the flap is open when the heat of the engine is excessive or an air conditioner is operated in summer, and thus, it is difficult to wash a contaminated portion of the flap. In addition, in the conventional active air flap, in a case where the heat of the engine and the outside temperature are excessive when the vehicle start is OFF, the active air flap enters sleep in a state of being open, that is, ends in a state where an outdoor air inlet is open.

In the conventional active air flap, in a state where the vehicle start is ON, only the vehicle speed and coolant temperature variables are mainly considered. Accordingly, there is no separate car wash mode, and thus, it is difficult to close the contaminated flap at the desired time.

In order to solve the existing problems, the present disclosure increases the number of cases for the operation logic and adds an operation logic such as forcibly closing the flap for a certain period of time within a range where technical problems do not occur.

In particular, according to the present disclosure, the flap can be opened or closed by changing a vehicle state information standard depending on whether the vehicle starts.

Figure 3:
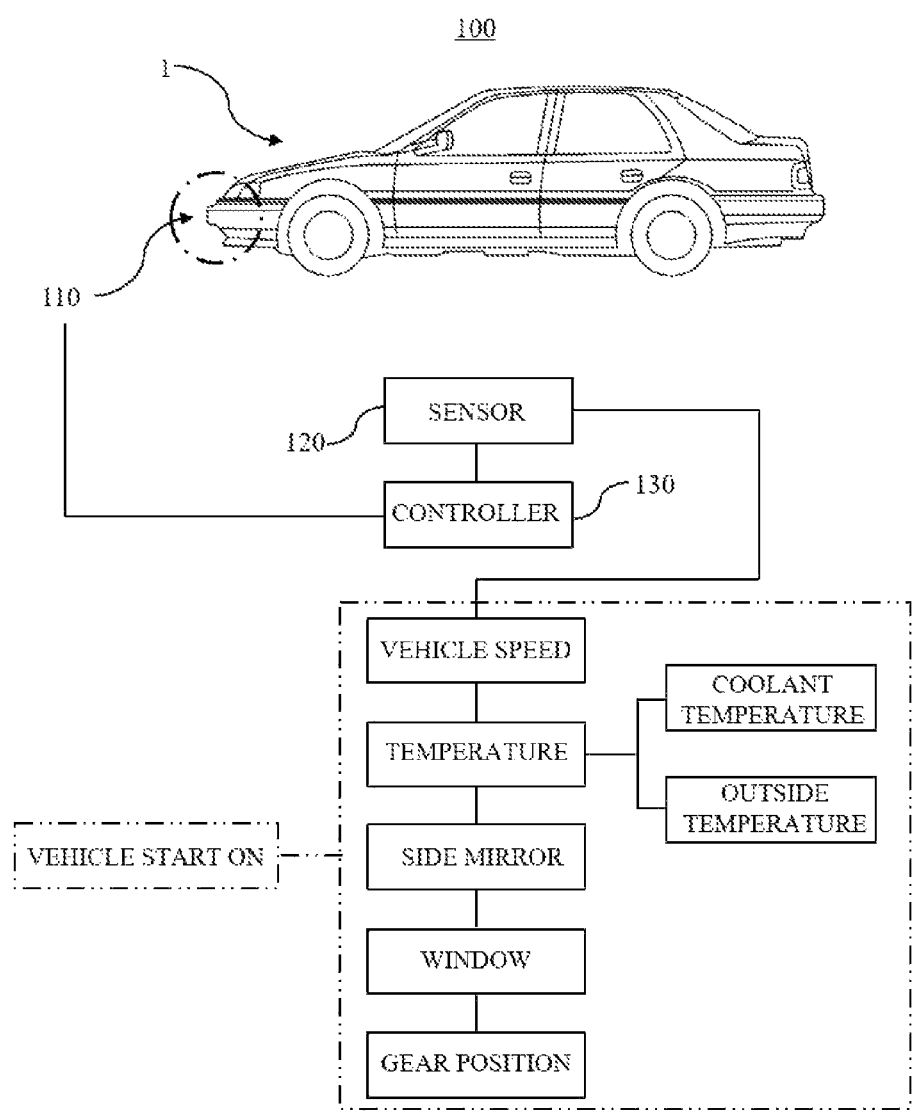
FIG. 3 is a view schematically showing a relationship between components applied based on various types of state information when a vehicle starts in the vehicle active air flap system according to one embodiment of the present disclosure.

FIG. 3 is a view schematically showing a relationship between components applied based on various types of state information when the vehicle start is ON in the vehicle active air flap system according to one embodiment of the present disclosure.

The active air flap system 100 in FIG. 3 has an operation logic that can close the flap 110 in a case where the vehicle is washed when the start of the vehicle 1 is ON.

The sensor 120 senses data about the vehicle speed, the temperature (coolant and outside air), the side mirror folding state, the window folding state, and the gear position when the start of the vehicle 1 is ON, and then transmits the data to the controller 130.

The controller 130 compares the sensing data value received from the sensor 120 with the preset driving condition data value and closes the flap 110 according to whether the result value matches the reference data (preset driving condition).

Here, the reference data is synonymous with the preset driving condition data and, more specifically, corresponds to when the vehicle speed is 30 km/h or less, the coolant temperature is 105° C. or less, the outside temperature is 40° C. or less, the side mirrors are folded, the window is closed, and the gear position is neutral or parked. When all of the above items are satisfied, the controller 130 drives and controls the flap 110 so that the outdoor air inlet of the grill is closed.

In this case, the controller 130 may be the Electronic Control Unit (ECU) itself of the vehicle 1 or may be a component connected to the ECU.

Figure 4:
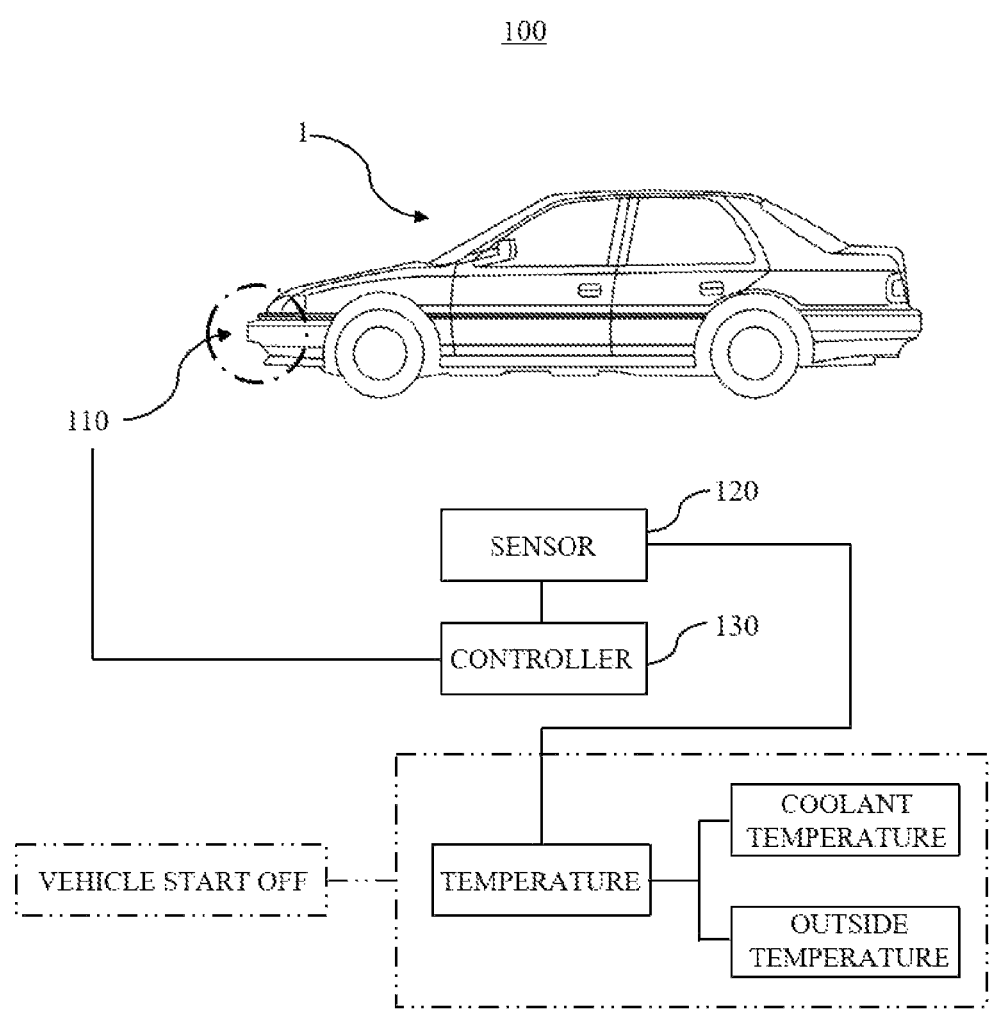
FIG. 4 is a diagram schematically showing the relationship between the components applied based on various types of state information when the vehicle start is OFF in the vehicle active air flap system according to one embodiment of the present disclosure.

FIG. 4 is a diagram schematically showing the relationship between the components applied based on various types of state information when the vehicle start is OFF in the vehicle active air flap system according to one embodiment of the present disclosure.

Referring to FIG. 4, the controller 130 allows the sensor 120 to sense the coolant temperature and outside temperature data values when the vehicle start is OFF.

In this case, the controller 130 immediately opens the flap 110 when the coolant temperature is greater than 105° C. among the data values sensed from the sensor 120 when the vehicle start is OFF.

In addition, the controller 130 closes the flap 110 for a certain period of time when the outside temperature is greater than 40° C. or more in a state where the coolant temperature sensed from the sensor 120 is 105° C. or less and, after that, opens the flap 110 when the outside temperature is still greater than 40° C. after the certain period of time.

Vehicle Active Air Flap System (Modification Example)

Figure 5:
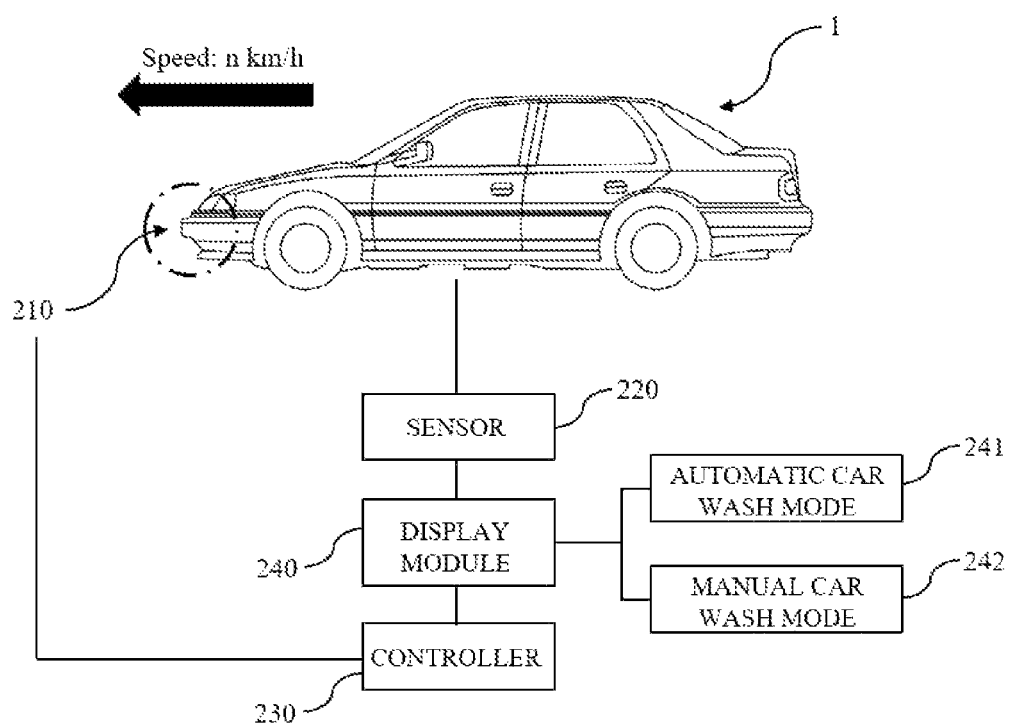
FIG. 5 is a view schematically showing a vehicle active air flap system according to another embodiment of the present disclosure.

FIG. 5 is a view schematically showing a vehicle active air flap system according to another embodiment of the present disclosure.

Referring to FIG. 5, an active air flap system 200 includes a flap 210, a sensor 220, a controller 230, and a display module 240.

In the descriptions of FIG. 5, descriptions of configurations overlapping the above-described configurations will be omitted, and differences will be mainly described.

The display module 240 is electrically connected to the sensor 220 to display an alarm message related to the state of the vehicle 1 so that a driver and/or a passenger can check the state of the vehicle 1.

The display module 240 may function as an infotainment system for a vehicle, that is, in a form made through a combination of audio/video/navigation (AVN) and the Internet.

The display module 240 includes an automatic car wash mode 241 and a manual car wash mode 242 to selectively open or close the flap 210 according to the preset driving condition.

In the automatic car wash mode 241, the flap 210 is switched to a closed state by the controller 230 in a state where the vehicle start is ON or OFF.

The driving condition of the automatic car wash mode 241 is set to the vehicle speed of 30 km/h or less, the coolant temperature of 105° C. or less, the side mirror folded state, the window closed state, and the neutral or parked position of the gear.

In the manual car wash mode 242, the flap 210 is switched to a closed state by the controller 230 in a state in which the vehicle start is OFF.

The driving condition of the manual car wash mode 242 is set to the coolant temperature of 105° C. or less and the outside temperature of 40° C. or less.

In this case, when the user applies the manual car wash mode 242, the controller 230 immediately opens the flap 210 when the coolant temperature is greater than 105° C. and closes the flap 210 for a certain period of time when the outside temperature is greater than 40° C. in a state where the coolant temperature is 105° C. or less.

Here, the controller 230 selects and adopts each driving condition according to the car wash mode of the display module 240 and opens or closes the flap 210 based on the adopted data information.

Vehicle Active Air Flap Control Method

Figure 6:
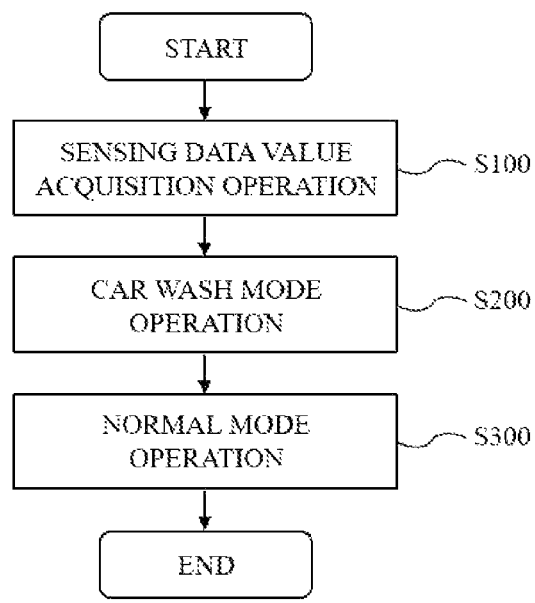
FIG. 6 is a flowchart schematically illustrating a vehicle active air flap control method according to one embodiment of the present disclosure.
Figure 7:
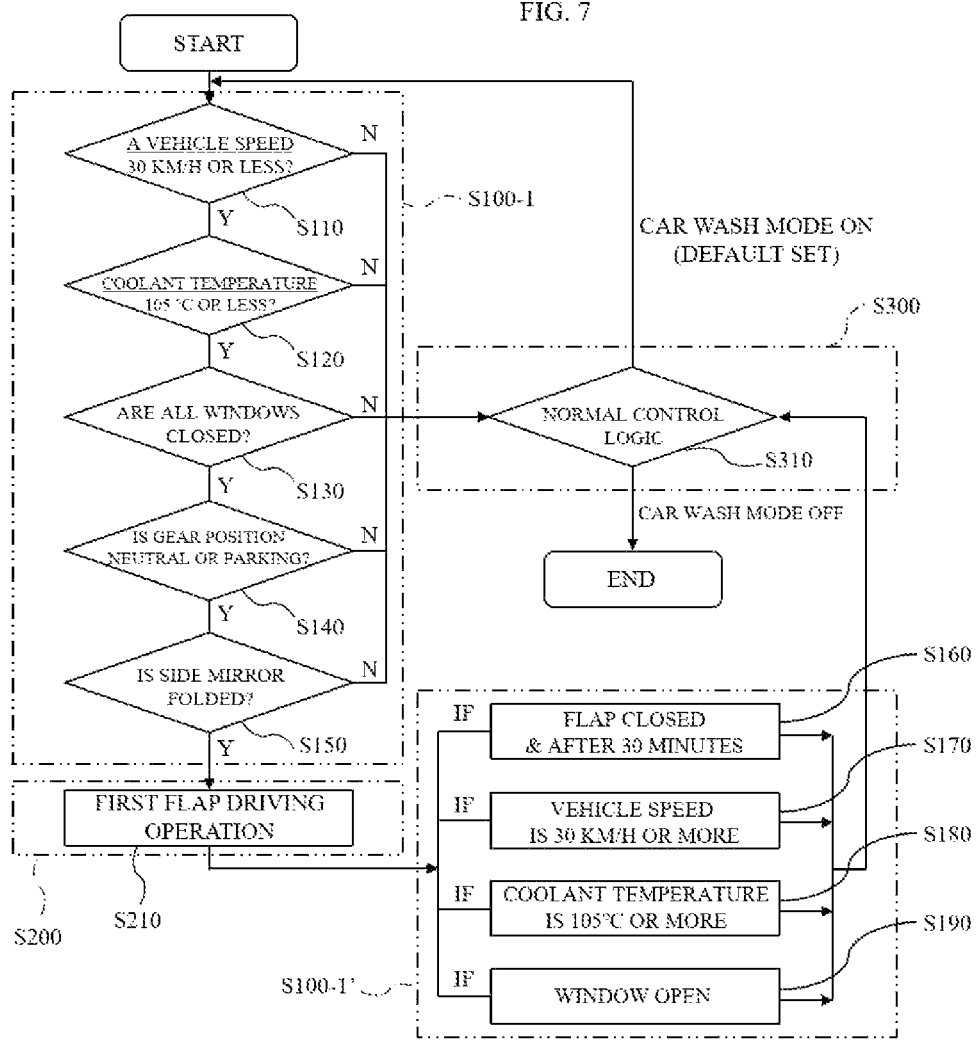
FIG. 7 is a flowchart illustrating an operation logic when the vehicle start is ON in the vehicle active air flap control method according to one embodiment of the present disclosure.
Figure 8:
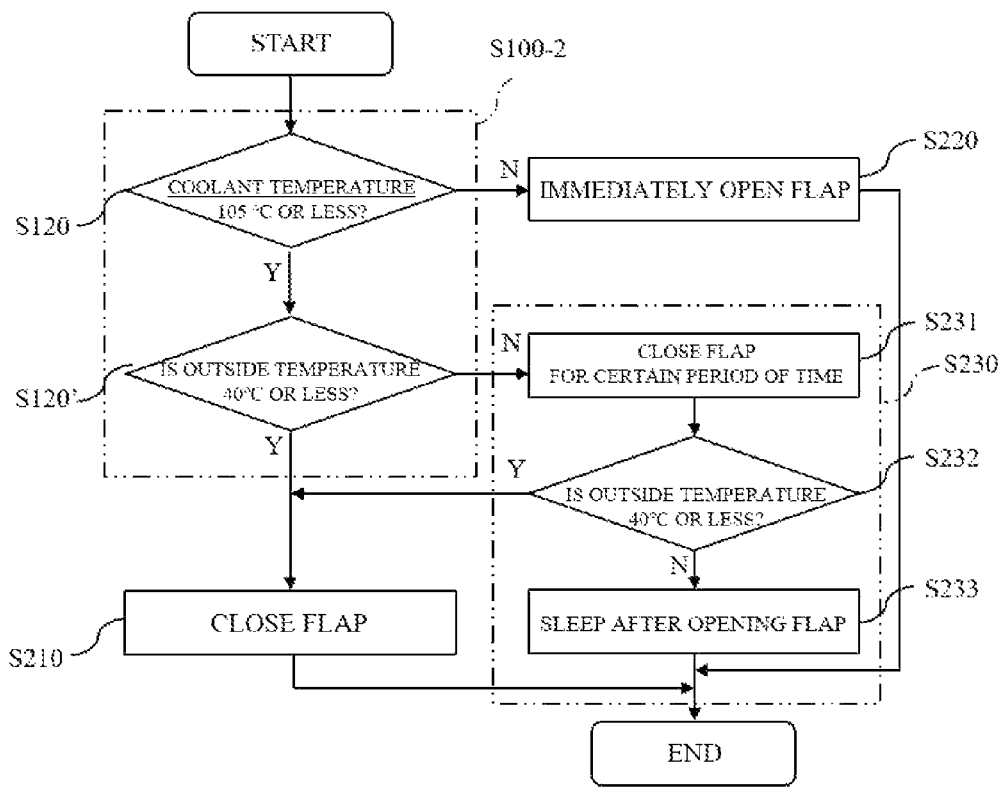
FIG. 8 is a flowchart illustrating an operation logic when the vehicle start is OFF in the vehicle active air flap control method according to one embodiment of the present disclosure.

FIG. 6 is a flowchart schematically illustrating a vehicle active air flap control method according to one embodiment of the present disclosure, FIG. 7 is a flowchart illustrating an operation logic when the vehicle start is ON in the vehicle active air flap control method according to one embodiment of the present disclosure, and FIG. 8 is a flowchart illustrating an operation logic when the vehicle start is OFF in the vehicle active air flap control method according to one embodiment of the present disclosure.

Referring to FIGS. 6 to 8 together, the vehicle active air flap control method includes a sensing data value acquisition operation S100, a car wash mode operation S200, and a normal mode operation S300.

In the sensing data value acquisition operation S100, various types of state information of the vehicle are sensed and acquired. The sensing data value acquisition operation (S100) includes a first sensing operation S100-1 and a second sensing operation S100-2.

In the first sensing operation S100-1, data values of a vehicle speed S110, a coolant temperature S120, a window opening/closing state S130, a gear position S140, and a side mirror folding state S150 are sensed when the vehicle start is ON.

In the second sensing operation S100-2, data values of the coolant temperature and the outside temperature data are sensed when the vehicle start is OFF.

In the car wash mode operation S200, the sensing data value obtained in the sensing data value acquisition operation S100 is compared with a preset driving condition data value, and when the result value matches the preset driving condition, the flap which opens or closes the outdoor air inlet of the vehicle grill is switched to a car wash logic method.

This car wash mode operation S200 includes a first flap driving operation S210, a second flap driving operation S220, and a third flap driving operation S230.

In the first flap driving operation S210, when the data values sensed in the first sensing operation S100-1 indicate that the vehicle speed is 30 km/h or less, the coolant temperature is 105° C. or less, the side mirror is folded, the window is closed, and the gear is in neutral or a parked position, the flap is driven and controlled so that the outdoor air inlet of the grill is closed.

In the second flap driving operation S220, the flap is immediately opened when the coolant temperature is greater than 105° C. among the data values sensed in the second sensing operation S100-2.

In the third flap driving operation S230, after the second flap driving operation S220, when the outside temperature is greater than 40° C. in a state where the coolant temperature is 105° C. or less, the flap is closed for a certain period of time (S231), and the flap is opened (S233) when the outside temperature is still greater than 40° C. (S232) after the certain period of time.

In the normal mode operation S300, when the sensing data value sensed in the sensing data value acquisition operation S100 does not match the preset driving condition, the flap is switched to the normal control logic method.

Figure 9:
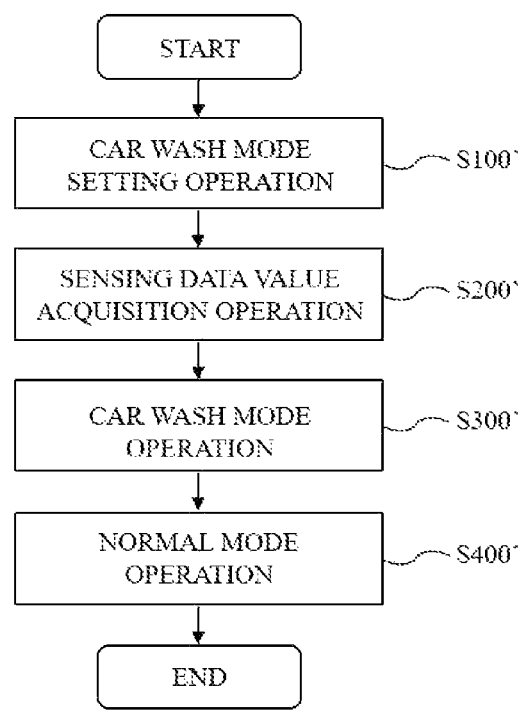
FIG. 9 is a flowchart schematically illustrating a vehicle active air flap control method according to another embodiment of the present disclosure.
Figure 10:
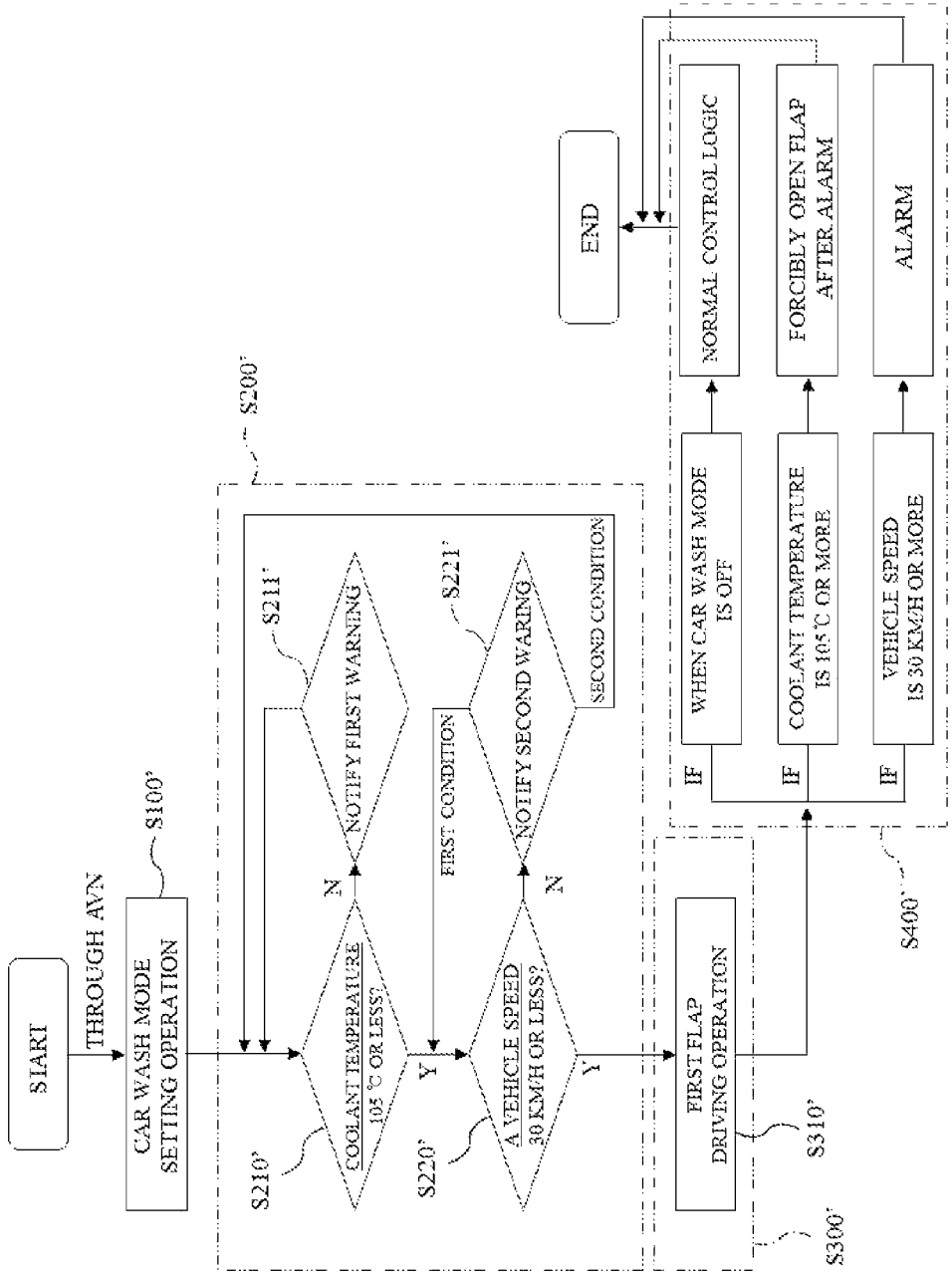
FIG. 10 is a flowchart illustrating an operation logic for setting a car wash mode through audio/video/navigation (AVN) in the vehicle active air flap control method according to another embodiment of the present disclosure.

FIG. 9 is a flowchart schematically illustrating a vehicle active air flap control method according to another embodiment of the present disclosure, and FIG. 10 is a flowchart illustrating an operation logic for setting the car wash mode through an AVN system.

Referring to FIGS. 9 and 10, the vehicle active air flap control method according to another embodiment of the present disclosure includes a car wash mode setting operation S100', a sensing data value acquisition operation S200', a car wash mode operation S300', and a normal mode operation S400'.

The car wash mode setting operation S100' is an operation of setting the car wash mode of the vehicle by using the AVN system. In this case, the car wash mode setting operation S100' includes an automatic car wash mode and a manual car wash mode.

In the sensing data value acquisition operation S200' of the present embodiment, when the coolant temperature and the vehicle speed are sensed and then compared with reference data, and when the result value does not match the reference data, first and second warning notifications (S211' and S221') allow the driver (and/or passengers) to recognize the relevant matter.

Here, the sensing data value acquisition operation S200' includes the window closed state, the gear position, and the side mirror folded state in addition to the coolant temperature and vehicle speed. However, only the coolant temperature and vehicle speed are displayed in FIG. 10 because the alarm message is displayed only for the corresponding item.

The second warning notification operation S221' is an operation of displaying a warning message to the driver when the vehicle speed does not match. Here, the first condition enters the operation S220' of checking the vehicle speed again when only the vehicle speed is 30 km/h or more. The second condition is a condition to enter the operation S210' of checking the coolant temperature in preparation for a situation in which the coolant temperature may be changed to greater than 105° C. again as the vehicle speed continues to be greater than 30 km/h.

When the operation is switched to the car wash mode operation S300' through the sensing data value acquisition operation S200', the flap is driven to close the outdoor air inlet of the grill through the first flap driving operation S310'.

In this case, the flap is opened when the user turns off the car wash mode, the coolant temperature is greater than 105° C., or the vehicle speed rises to greater than 30 km/h again.

Here, when the user turns off the car wash mode, the active air flap system is immediately switched to the normal control logic.

When the coolant temperature is greater than 105° C., a separate alarm is displayed to the user and the flap is forcibly opened.

Moreover, when the vehicle speed rises to greater than 30 km/h, a separate alarm is displayed to the user and the flap is opened.

As a result, according to the present disclosure, when the vehicle is washed (including automatic and manual), regardless of whether or not the vehicle starts, when the state of the vehicle matches the driving conditions, the flap is forcibly closed so that the contaminated portion of the flap can be washed together.

The present disclosure is not limited to the above-described embodiments, and various modifications can be made within a scope of a technical spirit of the present disclosure.

What is claimed is:

1. A vehicle active air flap system that is an external active air flap system, comprising:
   a flap configured to open or close an outdoor air inlet disposed in a grill of a vehicle;
   at least one sensor configured to detect various types of state information of the vehicle;
   a display module that is configured to display an automatic car wash mode and a manual car wash mode; and
   a controller configured to selectively adopt various sensing data values detected by the at least one sensor according to whether the vehicle starts and then compare at least one sensing data value of the adopted sensing data values with a preset vehicle driving condition data value to open or close the flap, according to a compared result value and a selection of a car wash mode among the automatic car wash mode and the manual car wash mode.

2. The vehicle active air flap system of claim 1, wherein the controller includes a display module that is electrically connected to the at least one sensor and configured to display an alarm message related to a vehicle state.

3. The vehicle active air flap system of claim 1, wherein the controller includes a display module that is configured to display, on a screen, the automatic car wash mode and the manual car wash mode to selectively open or close the flap according to a preset driving condition.

4. The vehicle active air flap system of claim 3, wherein, in the automatic car wash mode, the flap is switched to a closed state when a vehicle start state is ON or OFF, and
   in the manual car wash mode, the flap is switched to the closed state when the vehicle start state is OFF.

5. The vehicle active air flap system of claim 1, further comprising a display module that is electrically connected to the at least one sensor and configured to display an alarm message related to a vehicle state.

6. The vehicle active air flap system of claim 1, wherein the at least one sensor transmits different sensing data values to the controller according to whether the vehicle starts, senses data values of a vehicle speed, a coolant temperature, a side mirror folding state, a window opening/closing state, and a gear position when a vehicle start state is ON, and senses data values of the coolant temperature and an outside temperature when the vehicle start state is OFF.

7. The vehicle active air flap system of claim 6, wherein the controller controls driving of the flap so that the outdoor air inlet of the grill is closed in a case where the coolant temperature is a predetermined coolant temperature or less, a side mirror is folded, a window is closed, and a gear position is neutral or parked when the vehicle start state is ON.

8. The vehicle active air flap system of claim 7, wherein the predetermined coolant temperature is 105° C.

9. The vehicle active air flap system of claim 6, wherein the controller immediately opens the flap in a case where the coolant temperature is greater than a predetermined coolant temperature among the data values sensed by the at least one sensor when the vehicle start state is OFF, and closes the flap for a certain period of time when the outside temperature is greater than a predetermined outside temperature in a state where the coolant temperature is the predetermined coolant temperature or less, and opens the flap when the outside temperature is still greater than the predetermined outside temperature after the certain period of time.

10. The vehicle active air flap system of claim 9, wherein the predetermined coolant temperature is 105° C. and the predetermined outside temperature is 40° C.

11. A vehicle active air flap system that is an external active air flap system, comprising:
    a flap configured to open or close an outdoor air inlet disposed in a grill of a vehicle;
    a display module having an automatic car wash mode and a manual car wash mode to selectively open or close the flap according to a preset driving condition; and
    a controller configured to selectively adopt each driving mode according to a wash mode of the driving unit and to open or close the flap based on adopted data information.

12. The vehicle active air flap system of claim 11, wherein the display module allows the flap to be switched to a closed state by the controller in a state where a vehicle start state is ON or OFF when the automatic car wash mode is performed, and allows the flap to be switched to a closed state by the controller in a state where the vehicle start state is OFF when the manual car wash mode is performed.

13. The vehicle active air flap system of claim 12, wherein the preset driving condition in the automatic car wash mode is set to a coolant temperature being a predetermined coolant temperature or less, a side mirror folded state, a window closed state, and a neutral or parked position of a gear.

14. The vehicle active air flap system of claim 13, wherein the predetermined coolant temperature is 105° C.

15. The vehicle active air flap system of claim 12, wherein the preset driving condition of the manual car wash mode is set to a coolant temperature being a predetermined coolant temperature or less and an outside temperature being a predetermined outside temperature or less, and
    the controller immediately opens the flap in a case where a coolant temperature is greater than the predetermined coolant temperature when the mode is switched to the manual car wash mode, and closes the flap for a certain period of time when the outside temperature is greater than the predetermined outside temperature in a state where the coolant temperature is the predetermined coolant temperature or less.

16. The vehicle active air flap system of claim 15, wherein the predetermined coolant temperature is 105° C. and the predetermined outside temperature is 40° C.

17. A vehicle active air flap control method comprising:
    a sensing data value acquisition operation of sensing and acquiring various types of state information of a vehicle;
    a car wash mode operation of, in response to a selection of a car wash mode among an automatic car wash mode or a manual car wash mode, comparing an acquired sensing data value with a preset driving condition data value and switching a flap, which opens or closes an outdoor air inlet of a vehicle grill, to a car wash logic method corresponding to the selected car wash mode when a result value matches the preset driving condition; and a normal mode operation of switching the flap to a normal control logic method when the sensing data value does not match the driving condition.

18. The vehicle active air flap control method of claim 17, wherein the sensing data value acquisition operation includes a first sensing operation of sensing data values of a vehicle speed, a coolant temperature, a side mirror folding state, a window opening/closing state, and a gear position when a vehicle start state is ON, and a second sensing operation of sensing data values of the coolant temperature and an outside temperature when the vehicle start state is OFF.

19. The vehicle active air flap control method of claim 18, wherein the car wash mode operation includes:

a first flap driving operation of controlling driving of the flap so that the outdoor air inlet of the grill is closed when the data values sensed in the first sensing operation indicate that the vehicle speed is a predetermined vehicle speed or less, the coolant temperature is a predetermined coolant temperature or less, a side mirror is folded, a window is closed, and a gear is in neutral or a parked position;

a second flap driving operation of immediately opening the flap when the coolant temperature is greater than the predetermined coolant temperature among the data values sensed in the second sensing operation; and a third flap driving operation of closing the flap at a certain period of time when the outside temperature is greater than the predetermined outside temperature in a state where the coolant temperature is the predetermined coolant temperature or less after the second flap driving operation, and opening the flap when the outside temperature is still greater than the predetermined outside temperature after the certain period of time.

20. The vehicle active air flap control method of claim 19, wherein the predetermined coolant temperature is 105° C. and the predetermined outside temperature is 40° C.

* * * * *